UNITED STATES PATENT OFFICE.

JOHN W. TURNER, OF COVINGTON, LOUISIANA.

PROCESS OF MAKING ARTIFICIAL STONE.

SPECIFICATION forming part of Letters Patent No. 585,063, dated June 22, 1897.

Application filed December 30, 1896. Serial No. 617,481. (No specimens.)

*To all whom it may concern:*

Be it known that I, JOHN W. TURNER, a citizen of the United States, residing at Covington, in the parish of St. Tammany and State of Louisiana, have invented certain new and useful Improvements in Processes of Making Artificial Stone; and I do declare the following to be a full, clear, and exact description of the invention, such as will enable others skilled in the art to which it appertains to make and use the same.

This invention relates to the manufacture of artificial stone; and it more particularly relates to the production of monuments, posts, and other like objects in artificial stone in which engravings, designs, or other ornamentation appear upon the surface.

The object of the invention is to provide a simple and inexpensive process whereby stones of the character mentioned may be produced, the stone when completed being hard and durable and not liable to be injuriously affected by the action of the elements.

To this end and to such others as the invention may pertain the same consists in the process hereinafter described.

In carrying out my process I first prepare a compound consisting of one part, by weight, of Portland cement and two parts of flint-sand. These are thoroughly mixed together, and a sufficient quantity of water is then added to reduce the mixture to the consistency of an ordinary mortar. After thoroughly mixing the mixture thus produced is placed within a suitably-formed mold or matrix and the exposed surface upon which it is proposed to produce the engraving or other form of ornamentation is struck off. Immediately after thus striking off the surface I sift over the face of the stone rock-lime and then strike off, so as to produce a smooth face. While the surface is in this condition the engraving or other ornamentation is formed upon the surface thereof. The stone is then allowed to set, and is afterward removed from the mold. I then apply to those portions of the stone which are not provided with engravings or other ornamentation a mixture consisting of one-half part of Portland cement, one-fourth part of rock-lime, and one-fourth part of plaster-of-paris, all by weight, and the surfaces thus treated are at once dressed off smoothly.

When the stone has become thoroughly dry and hard, a mixture of one-half part rock-lime and one-half part plaster-of-paris, by weight, is uniformly applied over the entire surface of the stone, including the ornamented face or faces of the same.

Having thus described my invention, what I claim to be new, and desire to secure by Letters Patent, is—

The process of manufacturing artificial stone having ornamented surface, which consists in molding the stone from a composition of Portland cement and flint-sand in a plastic condition; then striking off the exposed surface upon which it is proposed to produce the ornamentation, then sifting over the face of the stone, rock-lime and striking off to produce a smooth face; and while the surface is in this condition, engraving the ornamentation upon the same, and allowing the stone to set, and after being removed from its mold, the surfaces of the stone not covered with the engraving or other ornamentation, being coated with a mixture consisting of one-half part of Portland cement, one-fourth part of rock-lime, and one-fourth part of plaster-of-paris by weight, and then applying to the entire surface of the stone a mixture of equal parts of rock-lime and plaster-of-paris, all substantially as set forth.

In testimony whereof I affix my signature in presence of two witnesses.

JOHN W. TURNER.

Witnesses:
    JESSE D. MCLAIN,
    GEORGE V. TURNER.